United States Patent
Dinges et al.

(10) Patent No.: US 8,275,809 B2
(45) Date of Patent: Sep. 25, 2012

(54) OBJECT PROCESSING SYSTEM USING AN OBJECT MODEL

(75) Inventors: Clemens Dinges, Obermichelbach (DE); Joachim Feld, Nürnberg (DE); Ronald Lange, Fürth (DE); Michael Schlereth, Wilhermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1353 days.

(21) Appl. No.: 10/432,431

(22) PCT Filed: Nov. 19, 2001

(86) PCT No.: PCT/DE01/04345
§ 371 (c)(1),
(2), (4) Date: Nov. 3, 2003

(87) PCT Pub. No.: WO02/42851
PCT Pub. Date: May 30, 2002

(65) Prior Publication Data
US 2004/0066406 A1    Apr. 8, 2004

(30) Foreign Application Priority Data
Nov. 24, 2000 (DE) .................................. 100 58 391

(51) Int. Cl.
*G06F 17/30* (2006.01)

(52) U.S. Cl. ........ 707/803; 707/610; 707/790; 707/796; 707/809

(58) Field of Classification Search ............... 707/2, 101, 707/1, 103, 100, 102, 103 R, 103 Y, 103 X, 707/3, 104.1, 793, 803, 805, 610, 790, 796, 707/809; 395/161, 700, 600
See application file for complete search history.

(56) References Cited

U.S. PATENT DOCUMENTS

| | | | | |
|---|---|---|---|---|
| 4,713,753 A | * | 12/1987 | Boebert et al. | 711/164 |
| 5,495,567 A | | 2/1996 | Iizawa et al. | |
| 5,499,371 A | * | 3/1996 | Henninger et al. | 717/108 |
| 5,594,881 A | * | 1/1997 | Fecteau et al. | 711/209 |
| 5,652,884 A | * | 7/1997 | Palevich | 713/1 |
| 5,918,225 A | * | 6/1999 | White et al. | 707/3 |
| 5,970,488 A | | 10/1999 | Crowe et al. | |
| 6,185,560 B1 | * | 2/2001 | Young et al. | 707/6 |
| 6,393,424 B1 | * | 5/2002 | Hallman et al. | 707/10 |
| 6,499,036 B1 | * | 12/2002 | Gurevich | 707/103 R |
| 6,539,388 B1 | * | 3/2003 | Hattori et al. | 707/101 |
| 6,571,252 B1 | * | 5/2003 | Mukherjee | 707/10 |
| 6,636,861 B1 | * | 10/2003 | Stack | 707/101 |
| 6,662,205 B1 | * | 12/2003 | Bereiter | 709/201 |
| 7,085,772 B1 | * | 8/2006 | Sternemann | 707/999.1 |

FOREIGN PATENT DOCUMENTS

| | | |
|---|---|---|
| DE | 198 45 043 | 3/2000 |
| DE | 19845043 | 3/2000 |
| DE | 199 17 269 | 10/2000 |
| DE | 9917269 | 10/2000 |
| WO | 94/29807 | 12/1994 |
| WO | 99/60487 | 11/1999 |
| WO | 00/65458 | 11/2000 |

* cited by examiner

*Primary Examiner* — Dangelino Gortayo
(74) *Attorney, Agent, or Firm* — Staas & Halsey LLP

(57) ABSTRACT

Several tools are included in an object processing system that also includes a common object model containing a data structure and an administrative program for the data structure. The tools have read access and optionally also write access to partial areas of the data structure via the administrative program. The partial areas can be different from one another and can contain mutually corresponding information. The administrative program optionally updates the other partial areas by compulsion, during write access approaches by a tool.

14 Claims, 2 Drawing Sheets

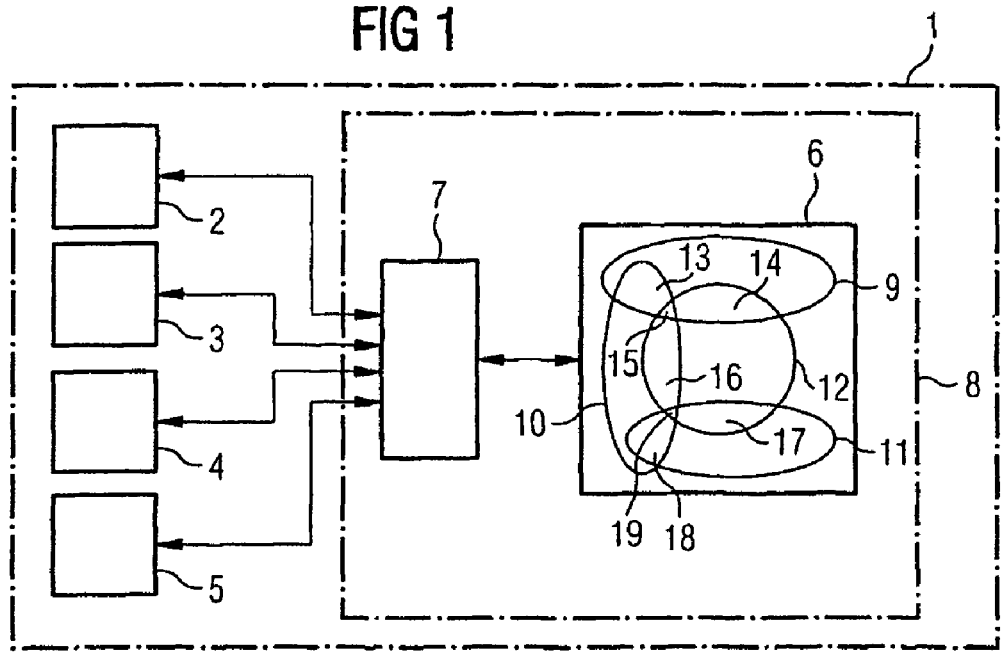
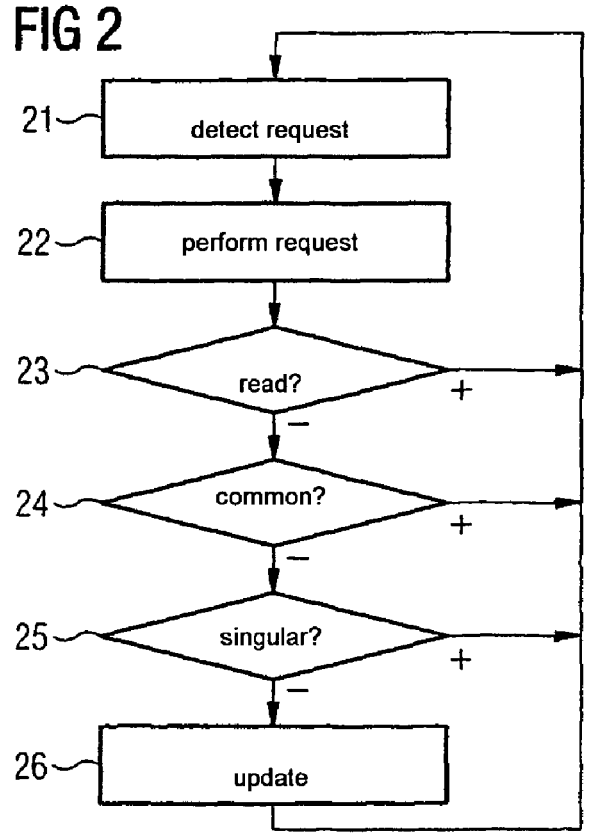

OBJECT PROCESSING SYSTEM USING AN OBJECT MODEL

CROSS REFERENCE TO RELATED APPLICATIONS

This application is based on and hereby claims priority to German Application No. 100 58 391.1 filed on Nov. 24, 2000, the contents of which are hereby incorporated by reference.

BACKGROUND OF THE INVENTION

1. Field of the Invention

The present invention relates to an object processing system having an object model and at least one basic tool and a supplementary tool, where the object model has a data structure and an administrative program for the data structure, where the data structure can be accessed by the tools using the administrative program, where the data structure includes a control program which can be executed by a process control unit and can be taken as a basis for the process control unit to control and/or monitor a technical installation using at least one input/output unit, where the data structure contains information about variables used by the process control unit when executing the control program, the storage location of the variables in the process control unit and possibly their links to one another, where the basic tool has read access to an associated subregion of the data structure, where the supplementary tool has read and write access to an associated subregion of the data structure, where the subregions differ from one another at least in part and contain information items which correspond to one another.

2. Description of the Related Art

Object processing systems are known generally. They normally involve the individual tools, independently of one another, accessing models which have a proprietary association with the respective tools. This applies equally to read and write access operations.

On account of the access operations to the individual models being independent of one another, the information items corresponding to one another in the models can be or can become inconsistent with respect to one another. In order to achieve consistency of the information nonetheless, this involves complex implementation of checking passes and mapping mechanisms. Nevertheless, consistency is not always guaranteed for the information items corresponding to one another in the models, or data are lost. The latter is true particularly if the same object is manipulated by a plurality of tools. It may also be necessary for data to be input a plurality of times if the corresponding mapping mechanisms are not available. In addition, the mapping mechanisms need to be programmed.

SUMMARY OF THE INVENTION

An object of the present invention is to provide an object processing system of the type mentioned initially in which consistent data management is easily ensured.

The object is achieved by virtue of the object model being in the form of a common object model and by virtue of the administrative program being designed such that write access to the data structure by the supplementary tool involves that subregion of the data structure which cannot be read by the supplementary tool being mandatorily updated at the same time if appropriate.

The basic tool is normally a user interface display tool or an execution tool for the control program. Correspondingly, the supplementary tool is normally a user interface creation tool or a control program creation tool.

Other combinations of tools are also possible, however. In particular, the object processing system can include all four of the aforementioned tools. In all cases, however, write access to the data structure by one of the tools always involves mandatory updating of all those subregions of the data structure which cannot be read by this tool.

If the data structure has a common region to which at least two tools have read access, the data structure is utilized particularly efficiently. In addition, the complexity of updating is reduced.

If the data structure contains a full information record for each tool which has access to the data structure, it can be used fully by any corresponding tool.

If a computer having such an object processing system is in the form of a process control unit, it is always ensured that the data called from the data structure by the tools reflect the control program which is to be executed by the process control unit.

If the computer is in the form of a computer with Internet capability and the tools can be called via the Internet, it is possible to call the tools from other computers. This naturally does not apply to the execution tool for the control program, which must always be executed by the process control unit itself.

BRIEF DESCRIPTION OF THE DRAWINGS

These and other objects and advantages of the present invention will become more apparent and more readily appreciated from the following description of an exemplary embodiment, taken in conjunction with the accompanying drawings of which:

FIG. 1 is a block diagram of an object processing system,
FIG. 2 is a flowchart.

DETAILED DESCRIPTION OF THE PREFERRED EMBODIMENT

Figure 3:
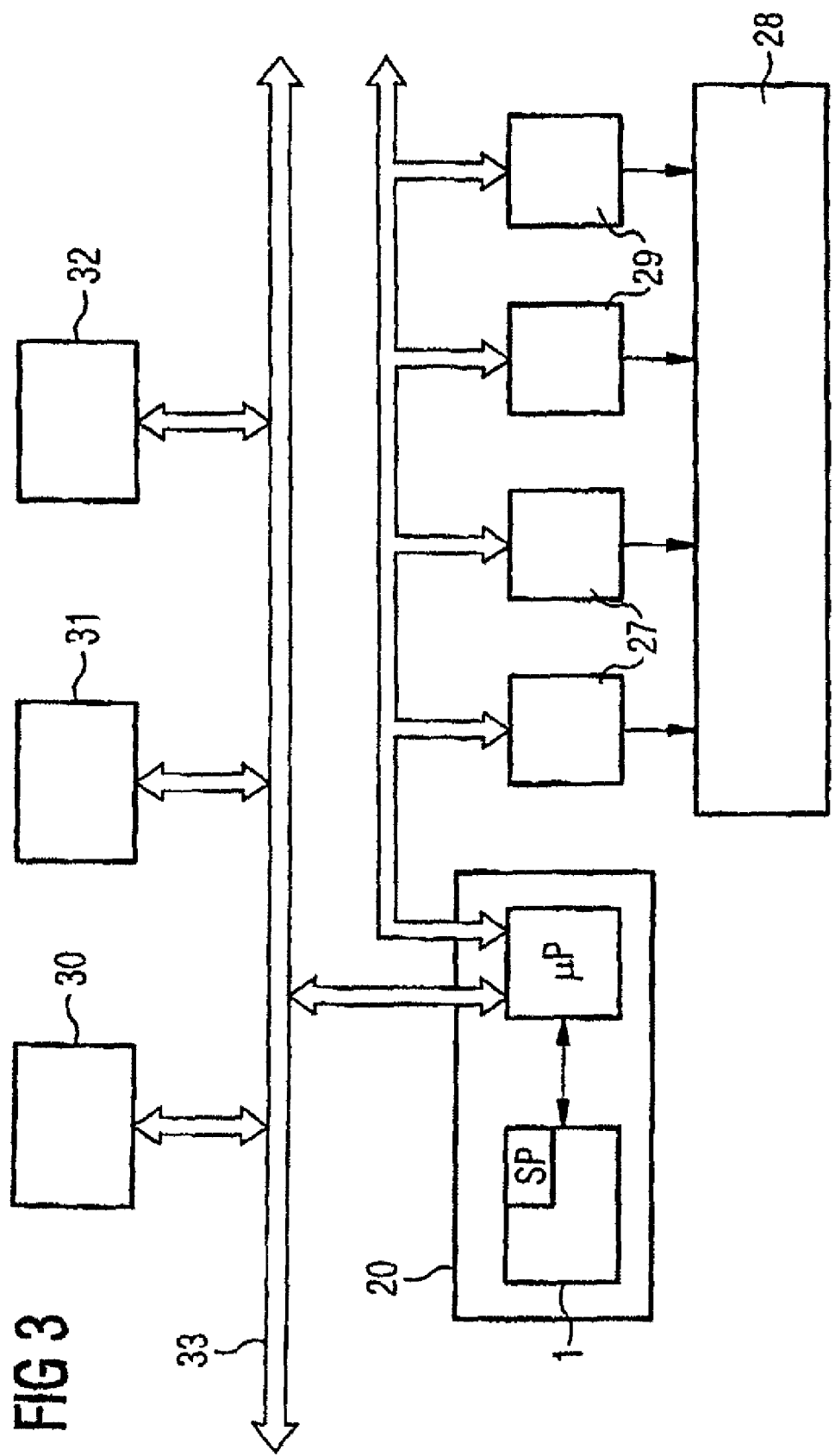
FIG. 3 is a block diagram of a computer network.

Reference will now be made in detail to the preferred embodiments of the present invention, examples of which are illustrated in the accompanying drawings, wherein like reference numerals refer to like elements throughout.

In line with FIG. 1, an object processing system 1 has four tools 2 to 5. These are an execution tool 2 for a control program SP, a user interface display tool 3, a control program creation tool 4 and a user interface creation tool 5. Within the context of the present invention, the execution tool 2 and the user interface display tool 3 are basic tools, and the control program creation tool 4 and the user interface creation tool 5 are supplementary tools.

The tools 2 to 5 can access a data structure 6. In this case, access is effected using an administrative program 7 for the data structure 6. The data structure 6 and the administrative program 7 together form an object model 8 which is common to all the tools 2 to 5.

For each of the tools 2 to 5, the data structure 6 contains a full information record. The information records are stored in subregions 9 to 12 of the data structure 6. In this case, the information record for the execution tool 2 forms the control program SP. Each of the tools 2 to 5 has read access to its associated subregion 9 to 12. The control program creation tool 4 and the user interface creation tool 5 also have write access to their associated subregions 11, 12.

As can be seen, the subregions 9 to 12 overlap but are not identical to one another. The subregions 9 to 12 thus differ from one another in part. However, the data structure 6 also has common regions 13 to 19 to which at least two tools 2 to 5 have read access.

The subregions 9 to 12 contain information items which correspond to one another. By way of example, they contain information about variables used by a process control unit 20 when executing the control program SP, the storage location of the variables in the process control unit 20 and possibly their links to one another. These information items need to be consistent with one another.

Hence, when the control program creation tool 4 or the user interface creation tool 5 effect write access to their associated subregions 11, 12, the other subregions 9, 10, 12 or 9 to 11 also need to be updated in order to ensure consistent data management. This task is performed by the administrative program 7. This program is designed such that, upon write access, it checks whether any updating is required and mandatorily performs this updating if appropriate.

In line with FIG. 2, the administrative program 7 detects access requests 21 and performs them 22. The administrative program 7 then checks 23 whether the access was read access. If so, the next access request is awaited. Otherwise, the administrative program 7 checks 24 whether a common region 13 to 19 (common to all tools 2 to 5) has been accessed. If so, the next access request is awaited. Otherwise, the administrative program 7 checks 25 whether the information written was singular and the other subregions 9, 10, 12 or 9 to 11 thus contain no corresponding information. If so, the next access request is awaited. Otherwise, the administrative program 7 updates 26 the subregions 9, 10, 12 or 9 to 11, if required.

In the simplest case, this involves pure copying. However, it is also possible for functional dependencies to exist. In this regard, the administrative program 7 has access to metainformation about the object model 8 so that the subregions 9 to 12 can be kept consistent in this case as well.

In line with FIG. 3, the object processing system 1 is stored in the process control unit 20. The computer 20 storing it is thus in the form of a process control unit 20. The process control unit 20 can execute the control program SP. This involves the process control unit 20 reading in process states from an industrial technical installation 28 via input units 27. In addition, it uses output units 29 to output control commands to the industrial technical installation 28. The process control unit 20 thus monitors the industrial technical installation 28 using the input units 27 and controls it using the output units 29.

Execution of the control program SP, that is to say implementation of the execution tool 2, needs—trivially—to occur in the process control unit 20 itself. By contrast, execution of the other tools 3 to 5, that is to say of the user interface display tool 3, of the control program creation tool 4 and of the user interface creation tool 5, can also occur in other computers 30 to 32. To this end, the process control unit 20 is or can be connected to these computers 30 to 32 via the Internet 33. The process control unit 20 is thus in the form of a computer 20 with Internet capability. The other tools 3 to 5 can therefore be called via the Internet 33, which allows remote programming and remote control of the process control unit 20.

The object model 8 is a unit. Preferably, it is therefore stored on a single computer 20, in this case on the process control unit 20. If suitable mechanisms ensure consistency, it can also be stored in distributed form, however. Preferably, as described, the tools 2 to 5 are also stored on the process control unit 20. This is also not absolutely necessary, however.

The invention has been described in detail with particular reference to preferred embodiments thereof and examples, but it will be understood that variations and modifications can be effected within the spirit and scope of the invention.

The invention claimed is:

1. An object processing system to control a technical installation, comprising:
at least one storage unit storing a common object model having a data structure, a control program and an administrative program, and storing at least one basic tool and at least one supplementary tool, the common object model being distinct from and commonly accessed by the at least one basic tool and the at least one supplementary tool which access the data structure included in the common object model via the administrative program included in the common object model, the at least one basic tool limited to read access of a first subregion of the data structure at all times and the at least one supplementary tool having read and write access to a second subregion of the data structure, the first and second subregions differing from one another at least in part and containing information items corresponding to one another, the first subregion is not a temporary copy of corresponding information items in the second subregion, the administrative program checking whether an updating is required and mandatorily updating the first subregion of the data structure, if appropriate, when the at least one supplementary tool writes to the second subregion of the data structure via the administrative program;
at least one input/output unit; and
a process control unit, coupled to said storage unit and said at least one input/output unit, to execute the control program to control the technical installation using said at least one input/output unit, the data structure containing information about variables used by said process control unit when executing the control program and storage locations of the variables in said process control unit.

2. The object processing system as claimed in claim 1, wherein the data structure stored in said storage unit includes links between the variables.

3. The object processing system as claimed in claim 1, wherein the at least one basic tool includes a user interface display tool.

4. The object processing system as claimed in claim 3, wherein the at least one supplementary tool includes a user interface creation tool.

5. The object processing system as claimed in claim 1, wherein the at least one basic tool includes an execution tool for the control program.

6. The object processing system as claimed in claim 5, wherein the at least one supplementary tool includes a control program creation tool that creates the control program executed by said process control unit to control the technical installation.

7. The object processing system as claimed in claim 1, wherein the data structure stored in said storage unit has a common region to which the basic and supplementary tools have read access.

8. The object processing system as claimed in claim 7, wherein the data structure stored in said storage unit contains a full information record for each tool which has access to the data structure.

9. The object processing system as claimed in claim 1,
further comprising a network interface connectable to the Internet; and
wherein the basic and supplementary tools can be called via the Internet.

10. The object processing system as claimed in claim 1, wherein the at least one basic tool and the at least one supplementary tool exchange data with the administrative program which, on behalf of the at least one basic tool and the at least one supplementary tool, accesses information stored in the data structure in the common object model formed by the data structure and the administrative program.

11. The object processing system as claimed in claim 1, wherein the technical installation is an industrial technical installation having process states input to said process control unit by said at least one input/output unit.

12. A method of processing object-oriented software, comprising:
storing a common object model having a data structure with a control program and an administrative program, and storing at least one basic tool and at least one supplementary tool, the common object model being distinct from and commonly accessed by the at least one basic tool and the at least one supplementary tool which access the data structure included in the common object model via the administrative program included in the common object model, the at least one basic tool limited to read access to a first subregion of the data structure and the at least one supplementary tool having read and write access to a second subregion of the data structure at all times, the first and second subregions differing from one another at least in part and containing information items corresponding to one another, the first subregion is not a temporary copy of corresponding information items in the second subregion;
accessing the data structure using the administrative program; and
checking whether an updating is required and mandatorily updating the first subregion of the data structure by the administrative program, if appropriate, when the at least one supplementary tool writes to the second subregion of the data structure via the administrative program.

13. The method as claimed in claim 12,
wherein said accessing and updating are performed by a process control unit executing the control program and the administrative program, and
wherein said storing stores information in the data structure about variables used by the process control unit when executing the control program and storage locations of the variables in said process control unit.

14. The method as claimed in claim 12, wherein the at least one basic tool and the at least one supplementary tool exchange data with the administrative program which, on behalf of the at least one basic tool and the at least one supplementary tool, accesses information stored in the data structure in the common object model formed by the data structure and the administrative program.

* * * * *